Figure 1:
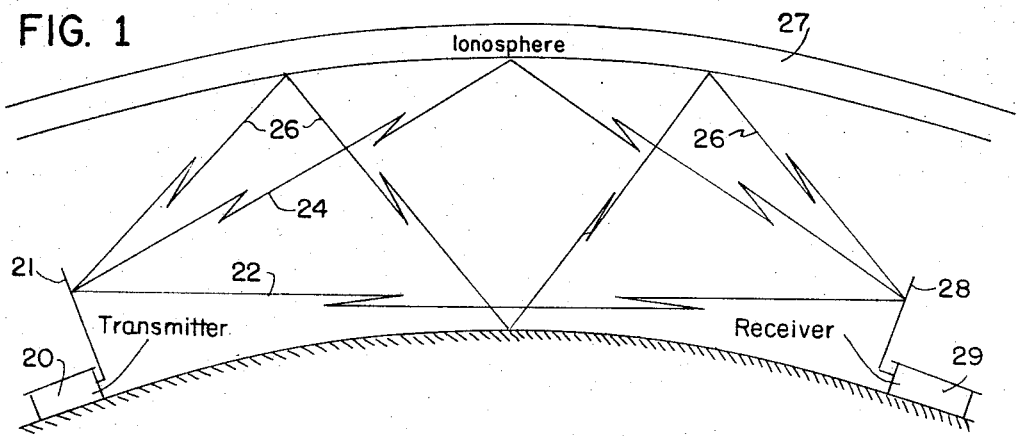

Nov. 7, 1967  E. J. GROTH, JR., ET AL  3,351,859

COMMUNICATION SYSTEM EMPLOYING MULTIPATH REJECTION MEANS

Filed Aug. 19, 1964  3 Sheets-Sheet 1

INVENTORS
STANLEY W. ATTWOOD
EDWARD J. GROTH JR.

Mueller and Aichele
ATTYS.

*INVENTORS*
STANLEY W. ATTWOOD
EDWARD J. GROTH JR.

Mueller and Aichele
ATTYS.

Nov. 7, 1967 E. J. GROTH, JR., ET AL 3,351,859
COMMUNICATION SYSTEM EMPLOYING MULTIPATH REJECTION MEANS
Filed Aug. 19, 1964
3 Sheets-Sheet 3
FIG. 5a
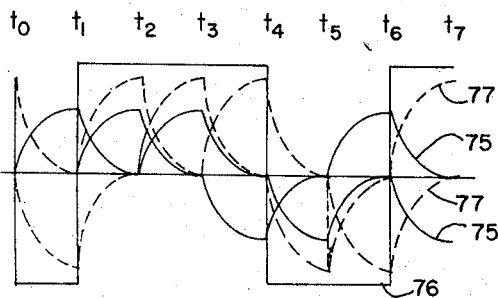
FIG. 5b
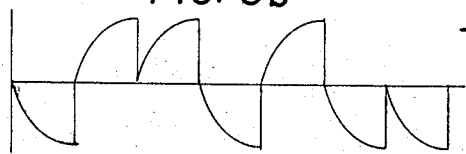
FIG. 5c
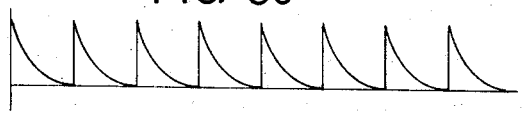
FIG. 5d
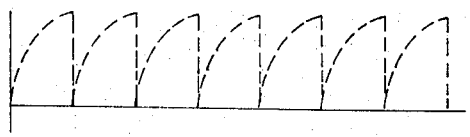
FIG. 5e
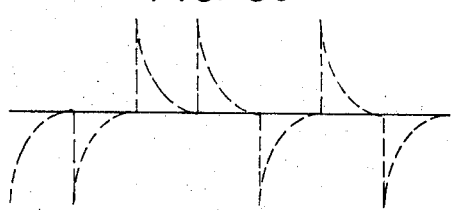
FIG. 6
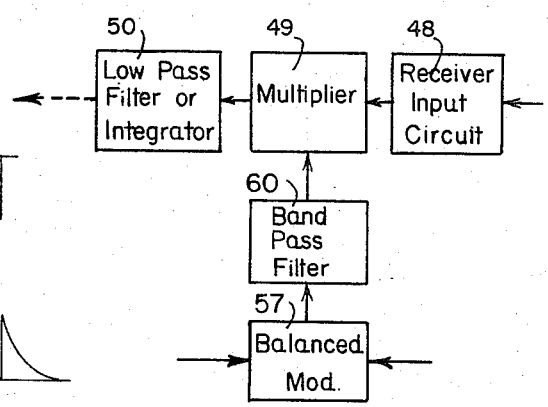
FIG. 7
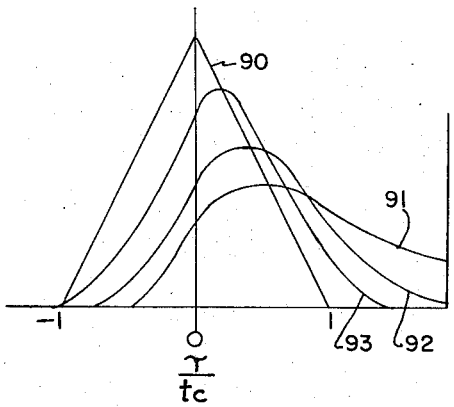
FIG. 8a
FIG. 8b
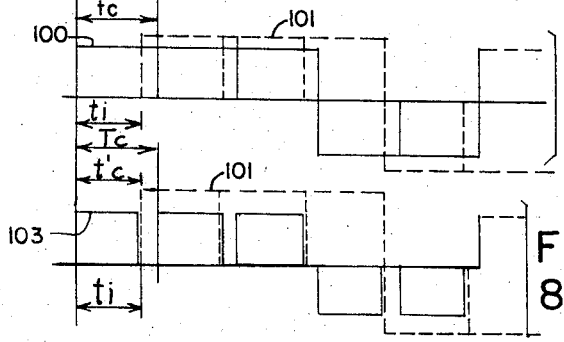
INVENTORS
STANLEY W. ATTWOOD
EDWARD J. GROTH JR.
Mueller and Aichele
ATTYS.

United States Patent Office 3,351,859
Patented Nov. 7, 1967

3,351,859
COMMUNICATION SYSTEM EMPLOYING
MULTIPATH REJECTION MEANS
Edward J. Groth, Jr., and Stanley W. Attwood, Scottsdale, Ariz., assignors to Motorola, Inc., Chicago, Ill., a corporation of Illinois
Filed Aug. 19, 1964, Ser. No. 390,591
10 Claims. (Cl. 325—42)

This invention relates to a system for the separation of identical signals successively received and partially overlapping, and in particular to the use of quasi-random noise modulation to distinguish between the identical signals.

It is desirable to distinguish between identical signals successively received and partially overlapping. An example of this reception is multipath transmission of a radio signal. A radio signal transmitted into space may travel over many different paths in reaching a receiver. These paths are formed by multiple reflections from the ionosphere and the surface of the earth. Signals thus reflected travel over a longer distance than a signal traveling directly from the transmitter to the receiver and will arrive at the receiver at a later time than a signal taking the shortest path. The time displacement between the signals transmitted over different paths is determined by the length of the paths over which the waves travel.

In making measurements with radio signals, it is important to be able to distinguish between identical signals which are transmitted to a receiver from a single transmitter over different paths. This is particularly true in navigational systems where the duration of time for the signal to travel from the transmitter to the receiver is a measure of the geographic or physical distance from the transmitter to the receiver.

Prior systems have been developed which provide means for distinguishing between the signals arriving by different paths by amplifying the received signal sufficiently so that its envelope characteristics can be examined, or by sending a coded series of pulses which enable the receiver to distinguish between signals arriving by different paths. These systems, while distinguishing between signals transmitted over different paths, use an inefficient form of pulse modulation. The transmitter antenna requirements for the necessarily high peak powers used make such systems extremely expensive and difficult to build. In addition, these systems are susceptible to jamming and therefore would be of doubtful use in military applications.

Accordingly, it is an object of this invention to provide an improved signal system which will distinguish between identical signals successively received and partially overlapping, and to reject all of the signals except the desired one.

Another object of this invention is to provide a radio system having a high transmission efficiency and which can distinguish between signals successively received and which are partially overlapping.

Another object of this invention is to provide a radio system having a high degree of security against jamming and which can distinguish between signals successively received and which are partially overlapping.

A feature of this invention is the provision of a radio transmission system in which the carrier wave is modulated by a quasi-random noise signal formed by successive pulse signals having a period less than the minimum time between the successively arriving signals.

Another feature of this invention is the provision of a radio transmission system in which the signal arriving at a receiver in the system is detected by correlation detection and wherein the locally generated signal is a quasi-random noise signal having the same characteristics as the signal used to modulate the transmitted carrier.

Another feature of this invention is the provision of a radio transmission system in which the signal arriving at a receiver in the system is detected by correlation detection and wherein the locally generated signal is modified by a filter having the same characteristics as that modifying the transmitted signal.

Figure 2:
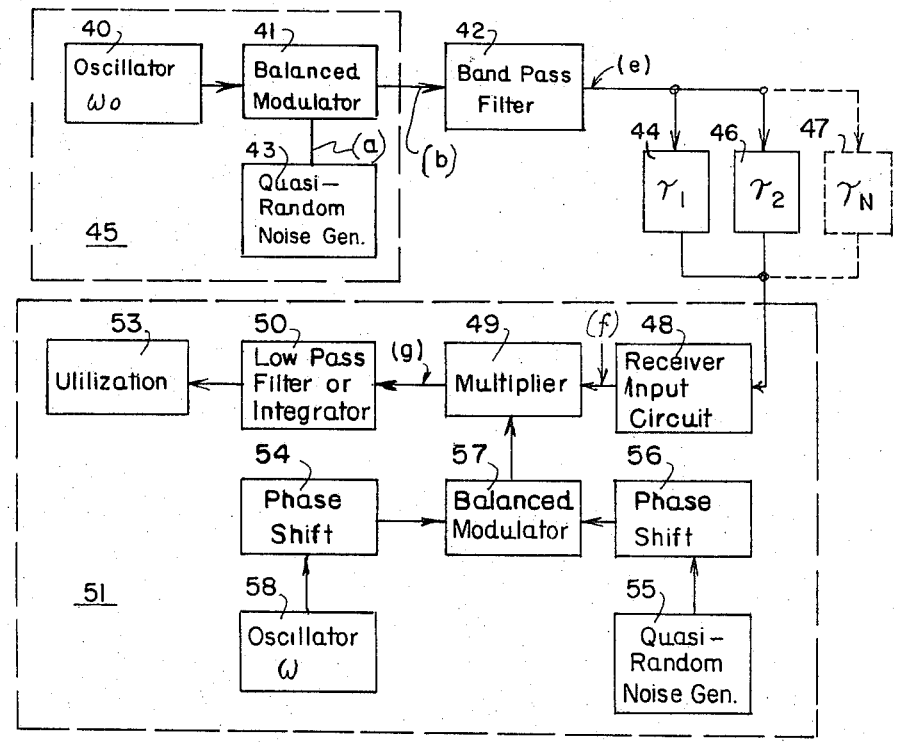
Figure 3A:
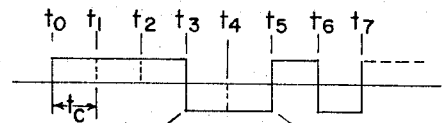
Figure 3B:
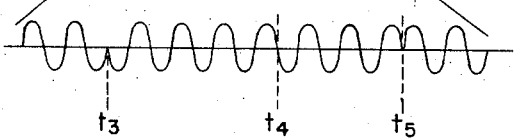
Figure 3C:
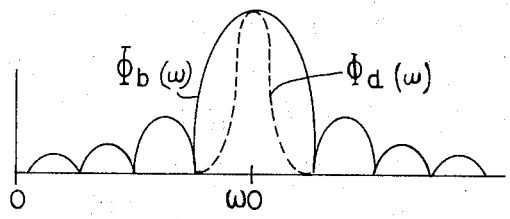
Figure 3D:
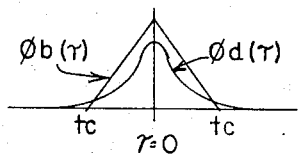
Figure 3E:
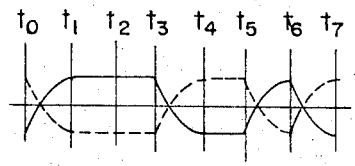
Figure 3F:
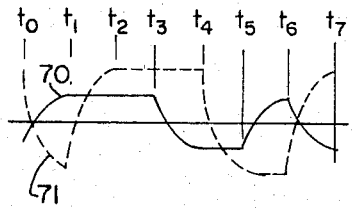
Figure 4A:
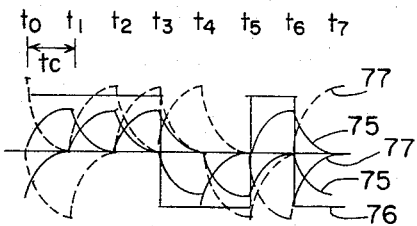
Figure 4B:
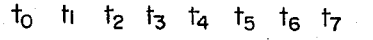
Figure 4C:
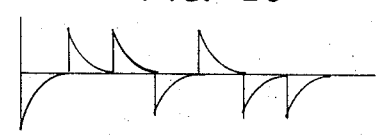
Figure 4D:
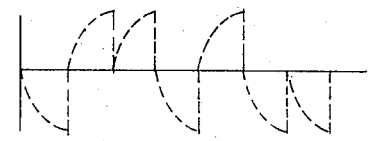
Figure 4E:
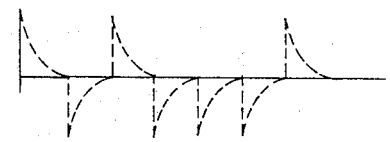
Figure 4F:
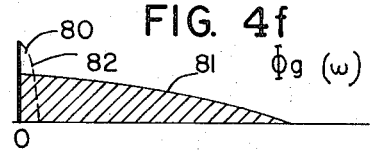

This invention is illustrated in the drawings wherein:
FIG. 1 illustrates multipath transmission;
FIG. 2 is a block diagram of the transmitter and receiver of this invention;
FIGS. 3A through 3F illustrate the forms of the signals at various points of the system of this invention;
FIGS. 4A through 4F illustrate correlation between the ground wave and the receiver reference signal;
FIG. 5 illustrates correlation between a skywave and the receiver reference signal;
FIG. 6 is a block diagram of a second embodiment of this invention;
FIG. 7 illustrates the correlation functions obtained from the embodiment shown in FIG. 6; and
FIG. 8 illustrates the quasi-random noise signals in the transmitter and receiver when the transmitter pulses are longer than the interval between received signals.

In practicing this invention a carrier signal is modulated with a quasi-random noise modulation wave form which permits pulse-like signals to be laid next to each other in time. The carrier signal so formed is transmitted over many paths to a receiver, with the carrier signals transmitted over the various paths being received at different times. The carrier signal may also be transmitted simultaneously by separate transmitters positioned at separate locations, or at different times by a single transmitter. The receiver provides means for separating the desired signal from the successively received partially overlapping signals. In the following description the successively received signals are developed by multipath transmission.

The transmitted carrier signal is multiplied by a receiver generated reference signal which is the same as the modulating signal at the transmitter, and which is delayed in time so that it is synchronized with the carrier signal arriving at the receiver over the desired path. The resultant product is integrated to develop a correlation function which is a maximum for the desired carrier signal and a minimum for those received over other paths.

The reference signal is comprised of pulses which have a pulse duration shorter than the interval between the reception, at the receiver, of signals which have traveled over different paths. This is necessary to prevent any coherent correlation between the reference signal and a carrier signal which has traveled over an undesired path. By maintaining the pulse duration of the pulses, which form the reference signal, shorter than the interval between the reception, at the receiver, of signals which have traveled over different paths, it is possible to terminate the multiplication of the reference signal and the desired carrier signal before any carrier signal arrives that has been transmitted over a different path and that can be coherent with the reference signal. In some applications the receiver reference signal is modified by filtering to obtain a signal more optimum for rejecting interfering wide band noise. Jamming protection is provided by using a quasi-random noise code unknown to a potential jammer.

FIG. 1 illustrates the problem of multipath transmission. A signal is transmitted from transmitter 20 by means of antenna 21, and received by antenna 28 of receiver 29. This signal can take many paths when traveling from antenna 21 to antenna 28. Three of these paths 22, 24 and 26, are illustrated. The signal traveling by path 22 goes directly from antenna 21 to antenna 28. This is the shortest path that the signal can take. The signal traveling by path 24 is reflected once from the ionosphere 27 before reaching antenna 28. The signal traveling via path 26 is reflected twice from the ionosphere 27 and once from the earth before reaching antenna 28. It can be seen that, in the cases where there are reflections, the path that the signals take is longer than the direct path from the transmitter to the receiver. Since the velocity of propagation of the signals in each path is relatively the same, signals transmitted over the longer path arrive at the receiver delayed in time relative to the signals taking shorter paths.

A block diagram of the receiver transmitter system of this invention is shown in FIG. 2. In transmitter 45, an oscillator 40 and a quasi-random noise generator 43 are coupled to balanced modulator 41. The carrier signal generated by oscillator 40 is modulated by the noise modulation signal generator 43 in the balanced modulator 41 and applied to band pass filter 42. Band pass filter 42 represents the effect of the transmitter and its antenna on the transmitter signal. It is assumed that the receiving antenna and the receiver input circuit are wide compared to the received signal. The signal is transmitted through paths 44, 46 and 47 which have time delays $\tau_1$, $\tau_2$, and $\tau_N$ respectively, introduced by the various paths over which the signal is transmitted to the receiver.

The carrier signal is applied to the receiver input circuit 48 of receiver 51 which is tuned to the frequency of the desired carrier signal. The output of receiver input circuit 48 is coupled to multiplier 49.

Quasi-random noise signal generator 55 develops the same modulating signal as modulation signal generator 43 and its output is coupled to balanced modulator 57 through phase shifting circuit 56. Oscillator 58 which may have the same frequency as oscillator 40 is coupled to balanced modulator 57 through phase shifting circuit 54, where it is modulated by the output of noise modulation signal generator 55. The output of the balanced modulator 57 is coupled to multiplier 49 where it is multiplied by the signal from receiver input circuit 48. The output from multiplier 49 is coupled to low pass filter or integrator 50 and from there to the utilization circuit 53. Phase shifting circuit 54 ensures that the phases of the carrier of the received signal and that of the reference signal are either in phase if the amplitude of the received signal is of interest or in quadrature if the phase of the received signal is of interest. Phase shifter 56 is adjusted to set the phase of the quasi-random modulation signal from noise generator 55 in phase with the modulation of the received signal which it is desired to separate from the signals which are later or earlier in time. The amount of phase shift required is determined by the delay in the paths $\tau_1$, $\tau_2$ ... $\tau_N$.

Curve $a$ of FIG. 3 illustrates a typical modulation signal appearing at the output ($a$) of quasi-random noise generators 43 and 55. The output of the noise generators is a sequence of positive and negative voltages which represent a sequence of ones and zeros and which occur in a quasi-random fashion. That is, the output appears to be generated in a random fashion but it has a fixed, known order. Such a signal can be generated by a maximal length linear recirculating shift register. Word length, or the number of bits before the sequence repeats, is equal to $p = 2^b - 1$ bits and the period of the word thus generated is equal to $(2^b - 1)t_c$ where $t_c$ equals the pulse duration of each bit and $b$ equals the number of stages in the shift register.

The normalized auto correlation function $R(\tau)$ of the output from noise generators 43 and 55 may be expressed by the formulas $$R(\tau) = 1 - \frac{p+1}{p}\frac{\tau}{t_c}|\tau| \leq t_c \qquad (1)$$

and $$R(\tau) = \frac{1}{p} \approx 0 |\tau| > t_c \qquad (2)$$

for a shift register having a large number of stages $$R(\tau) \doteq 1 - \frac{|\tau|}{t_c}|\tau| \leq t_c \qquad (3)$$

and $$R(\tau) \doteq 0 |\tau| > t_c \qquad (4)$$

For a long word length this signal has the characteristics similar to a random pulse train where the ones and zeros are chosen by flipping a "true" coin. If only the central portion of the spectrum is used and the word length is long, the result is a signal that is very similar in appearance and behavior to band limited white gaussian noise.

Curve $b$ of FIG. 3 is an expanded section of the output of oscillator 40 modulated by the output of noise generator 43 and is the output of balanced modulator 41 which appears at $b$ of receiver 45. It should be noted that a time $t3$ and $t5$, where the output from noise generator 43 undergoes a polarity reversal, the sine wave output of oscillator 40 is shifted 180° in phase. At time $t4$ where there is no polarity reversal of the output of noise generator 43, there is no phase reversal of the output of oscillator 40.

Curve $c$ of FIG. 3 illustrates the power spectral density $\Phi_b(\omega)$, of the modulated signal shown in curve $b$ of FIG. 3.

$$\Phi_b(\omega) = \left(\frac{\sin \omega \frac{t_c}{2}}{\omega \frac{t_c}{2}}\right)^2 \qquad (5)$$

The envelope of the auto correlation function, $\phi(\tau)$, of the signal in curve $b$ of FIG. 3 is shown in curve $d$ of FIG. 3.

$$\phi_b(\tau) = 1 - \frac{|\tau|}{t_c}|\tau| \leq t_c \qquad (6)$$

$$\phi_b(\tau) = 0 |\tau| > t_c \qquad (7)$$

These values are approximate and approach equality as the period of the word used for modulation increases. It is possible to use random codes whose correlation function is identically zero for $|\tau| > t_c$ even if the code is short.

The antennas and the circuits used in the transmitter of the system are limited in frequency and this frequency limitation is represented by band pass filter 42. The spectral density of the output of this band pass filter is represented in curve $c$ of FIG. 3 as $\Phi_d(\omega)$ and the auto correlation function of this signal is represented by $\phi_d(\tau)$ in curve $d$ of FIG. 3. As shown in curve $c$ of FIG. 3 the effect of the band pass filter 42 is to attenuate frequencies above and below a particular band. The envelope of the signal at the output of band pass filter 42 is shown in curve $e$ of FIG. 3.

However, because of the various paths of different lengths shown in FIG. 1 the same signal may be received delayed in time by different amounts $\tau_1$, $\tau_2$ ... $\tau_N$ of FIG. 2. Curve $f$ of FIG. 3 shows the detected signal 70 at $f$ the input to multiplier 49 which has been transmitted over the shortest transmission path and a signal 71 which has been transmitted over a longer path and which may exceed the direct signal 70 in amplitude.

The received signal is multiplied with the output of balanced modulator 57 which is identical in output from the modulator 41 except that it has been delayed in time by phase shifting circuits 54 and 56 so that is synchronized with the received signal. The amount of phase shift required is a function of the transmission path length.

The received signals 70 and 71 shown in curve $f$ of FIG. 3 can be represented as a series of pulses as shown in curve $a$ of FIG. 4. Since the pulses are rounded because of the filtering characteristics of the transmission system, as represented by band pass filter 42, they will have rounded leading edges and trailing edges. The trailing edges will be referred to as tails. In curve a of FIG. 4 line 75 represents the received pulse which has traveled over the shortest path and is known as the ground wave. Line 76 represents the reference signal generated by the receiver with which the received pulses are multiplied. A second series of pulses 77 having the same sequence as those comprising the ground wave 75 but delayed in time represent a signal which has traveled over a longer transmission path than the ground wave and is known as a skywave. It should be noted that the amplitudes of these signals are not necessarily the same and in the example shown the skywave is stronger than the ground wave. The skywave signal has tails as does the ground wave signal. Curve b of FIG. 4 illustrates the result of multiplying the ground wave signals with the reference signal generated by the receiver. It can be seen that the resulting signal is of one polarity and will result in a DC voltage of some average magnitude when integrated by integrator 50 of FIG. 2. Curve c of FIG. 4 represents the result of multiplying the tails of the ground waves by the receiver reference signal. It can be seen that the results of this multiplication is a series of positive and negative pulses. If this series of pulses is integrated by integrator 50 of FIG. 2 it will produce an output which is zero provided the period of the noise transmission word used is very long with respect to the period of the individual pulses. Curves d and e of FIG. 4 represent the result of multiplying the skywaves 77 of curve a of FIG. 4 by the receiver reference signal. The correlation function of these waves is also zero.

The power spectral density $\Phi_g(\omega)$ of the signal at point g of FIG. 2 the output of multiplier 49, is shown in curve f of FIG. 4. The power due to the receiver reference signal multiplied by the signal received over the shortest path is shown as a heavy black line 80 at zero frequency. The power resulting from the waves received over longer paths and from the tails of the ground waves is represented by the area 81. By passing this signal through a low pass output filter, represented by 82 of curve f of FIG. 4 and 50 of FIG. 2, an essentially direct current output is obtained. This output is a maximum when the receiver reference signal is in phase with the desired signal.

Thus the correlation function of the ground wave is a maximum when the reference signal generated by the receiver is in phase with the received ground wave. There is no contribution to the correlation function of the ground wave from the correlation function of the tails of the ground wave or the succeeding skywaves as the correlation functions of these waves under these circumstances is zero. Since the cross correlation function of any noise added to the signal during its transmission is not coherent with the receiver reference signal the correlation function of this added noise and the receiver reference signal is everywhere zero.

It should be noted that in order to eliminate the effects of any skywaves from the correlation function of the ground wave the pulse duration $t_c$ of the reference signal generated at the transmitter and the receiver, is less than the time interval between the reception of the ground wave and the following skywave or between any skywave and the next succeeding skywave. If this is not the case, the reference signal generated in the receiver will be multiplied by an undesired skywave with which it is coherent and this correlation will produce a component which is added to the correlation function of the desired signal producing an error in its correlation function.

Curve a of FIG. 5 represents the ground wave 75 and skywave 77 of curve a of FIG. 4 with the receiver reference signal 76 in phase with the skywave 77. Curves b, c, d and e of FIG. 5 represent the result of multiplying the receiver reference signal by the ground wave and skywave when the reference signal is in phase with the skywave. It can be seen that the correlation function of the signals in curves b and e of FIG. 5, the ground wave signal and skywave tails multiplied by the reference signal, will be zero. The correlation function of the skywave is a maximum value when the receiver reference signal is in phase with it as can be seen from curve d of FIG. 5. Thus the skywave signal is separated from the other signals present. However, in this case it should be noted that the reference signal multiplied by the tails of the ground wave produces a signal which will have a correlation function greater than zero. This is caused by all or a portion of the tails of the ground wave being present at the same time as the skywave signal and also being coherent with the reference signal.

The fact that the tails of the preceding waves can overlap the succeeding waves means that any wave other than the wave arriving by the shortest path may contain an error caused by the contribution of the correlation function of the receiver reference signal with the tails of the preceding wave.

Referring to FIG. 7, curves 90, 91, 92 and 93 are the responses of the receiving system to a signal which arrives over a single path. In this correlation type receiver these responses are the correlation curves of transmitted and receiver reference signals. Curve 90 is the response as a function of $\tau$, the timing delay between the received signal and the receiver reference, if both signals are as described above and no filtering exists in either signal. Curves 91, 92 and 93 are the responses when filtering is present on the transmitted signal only. The system described above has no filtering in the receiver reference and consequently the system response is one of the forms shown in FIG. 7. In all cases if the received signal lags the receiver reference signal by more than $t_c(\tau/t_c<-1)$ then the response is zero. In all cases, however, if the received signal lags by less than $t_c$ and no matter how much lead it may have, the response is greater than zero.

In the case examined above when synchronized to the skywave, the ground wave leads the receiver reference. Therefore it contributes to the system response. If interest is confined to the skywave, the response is in error by the amount of response to the ground wave.

Because of the response to signals which lead the desired signal it is desirable to minimize the influence of the leading signals. This is accomplished by using as wideband signals as possible, that is, reducing $t_c$ to a minimum. However, if the filtering imposed on the transmitted signal cannot be broadened beyond some point further reduction of $t_c$ will not help and will result in inefficient operation. To minimize the influence of leading signals the receiver of FIG. 2 can be modified as shown in FIG. 6. A bandpass filter 60 is inserted between the balanced modulator 57 and the multiplier 49. A minimum response to leading signals is achieved by matching the filter 60 to the filtering on the transmitted signal. In this case the system response is the same as curve 3d or $\phi_d(\tau)$. The penalty paid when minimizing the leading signals is that the response to signals which lag the desired signal increases. The amount of filtering in the receiver can be adjusted to minimize the total undesired response for any specific case.

In the above example described above the signals generated by quasi-random noise generators 43 and 55 of FIG. 2 are substantially the same. The quasi-random noise signal consists of a series of pulse having a predetermined order and a pule duration $t_c$ equal to then period of the pulse $T_c$. (See FIG. 3a). The pulse duration $t_c$ and period $T_c$ are made less than the interval between the reception of any two identical signals transmitted from the transmitter to the receiver over different paths to prevent the generation of a correlation function component produced by the multiplication of the reference signal by an undesired skywave with which it is coherent. If the pulse duration were not made less than the interval between the reception of the identical signals the component generated would be added to the correlation function of the desired signal and would produce an error in its correlation function.

However, the quasi-random noise signals at the transmitter and receiver need not be identical and the pulse duration $t_c$ and period $T_c$ of the signals at the transmitter can be longer than the interval between the reception of any two identical signals transmitted from the transmitter to the receiver over different paths. This is shown in curve $a$ of FIG. 8. The predetermined order of pulse signals shown in FIG. 8 is the same as that shown in curve $a$ of FIG. 3. Curve 100 represents the predetermined order of pulses generated by the transmitter quasi-random noise generator having a pulse duration $t_c$ and a period $T_c$. Curve 101 represents quasi-random noise signals 100 delayed in time because of the different lengths of the transmission paths. The interval between the signals 100 and 101 is $t_i$ and is less than $t_c$. Thus if the receiver quasi-random noise signal were made identical to the transmitter noise signals a portion of the undesired signal 101 would be coherent with the quasi-random noise signal at the receiver and there would be an error in the correlation function of the desired signal.

This error can be eliminated by making the pulse duration $t'_c$ of the receiver quasi-random noise signal less than $t_i$ as is shown in curve $b$ of FIG. 8. Curve 101 again represents the signal delayed in time by an interval $t_i$. Curve 103 is the quasi-random noise signal generated by the receiver. It has the same predtermined order of pulses and the same period $T_c$ as the signal generated by the transmitter but the pulse duration $t'_i$ is no greater than the pulse duration $t_c$ of the transmitter signal and is less than the interval $t_i$ between the reception of any two identical signals transmitted from the transmitter to the receiver over different paths. During the time that the undesired signal is coherent with the receiver quasi-random noise signal, this signal reduces to zero and the component, generated by multiplier 49 of FIG. 2, due to the undesired signal is zero. Thus no error is introduced to the correlation function of the desired signal even though the pulse duration of the transmitter quasi-random noise signal is greater than the interval between identical signals at the receiver.

While in the above example a system has been described which distinguishes between identical signals transmitted from a single transmitter to a single receiver over different paths, the invention is not limited to this system. The system can be used to distinguish between any two identical signals having quasi-random noise modulation thereon which are received by a receiver at different times. For example, the identical signals may be transmitted simultaneously by separate transmitters positioned at different locations, or at different times by a transmitter or transmitters positioned at the same location.

Thus a method of selecting a particular signal from a group of identical signals received at different times by a single receiver has been shown. By using a suitable form of quasi-random noise modulation, in which the pulses forming the modulation have a period less than the time interval between successive receptions of the same signal, maximum rejection of undesired signals is achieved.

What is claimed is:

1. A signal transmission system including in combination, transmitter means having a first signal generator for providing a carrier wave signal modulated by a first quasi-random noise signal having a predetermined order of pulse signals with a first pulse duration and a predetermined period, and a receiver having a second signal generator for providing a reference signal modulated by a second quasi-random noise signal having said predetermined order of pulse signals with said predetermined period, said second quasi-random noise signal having a second pulse duration no greater than said first pulse duration and less than the interval between the reception of any two identical signals received at different times and modulated by said first quasi-random noise signal and transmitted to said receiver, said second signal generator including phase shifting means for shifting the phase of said second quasi-random noise signal relative to said received first quasi-random noise signal, said receiver including multiplier means coupled to said second signal generator and adapted to receive said carrier wave signal, said multiplier means acting to multiply said reference signal and said carrier wave signal, and integrator means coupled to said multiplier means for integrating the signal produced by said multiplier means.

2. A signal transmission system for distinguishing between identical signals transmitted from a single transmitter to a single receiver over different paths, said system including in combination, a transmitter having a first signal generator for providing a carrier wave signal modulated by a first quasi-random noise signal having a predetermined order of pulse signals with a first pulse duration and a predetermined period, and a receiver including a second signal generator for providing a reference signal modulated by a second quasi-random noise signal having said predetermined order of pulse signals with said predetermined period, said second quasi-random noise signal having a second pulse duration no greater than said first pulse duration and less than the interval between the reception of any two identical signals transmitted from the transmitter to the receiver over different paths, said second signal generator including phase shifting means for shifting the phase of said second quasi-random noise signal relative to said first quasi-random noise signal, said receiver including correlation means coupled to said second signal generator and adapted to receive said carrier wave signal, said correlation means being responsive to said carrier wave signal and said reference signal to develop a correlation function to thereby distinguish between identical signals transmitted over different paths.

3. A signal transmission system for distinguishing between identical signals transmitted from a single transmitter to a single receiver over different paths, said system including in combination, a transmitter having a first modulation generator for providing a first quasi-random noise modulation signal having a predetermined order of pulse signals with a first pulse duration and a predetermined period, means coupled to said first modulation generator and responsive to said first modulation signal to form a carrier wave signal modulated by said first modulation signal, and a receiver having a second modulation generator for providing a second quasi-random noise modulation signal having said predetermined order or pulse signals and said predetermined period, said second quasi-random noise modulation signal having a second pulse duration no greater than said first pulse duration and less than the interval between the reception of any two identical signals transmitted from the transmitter to the receiver over different paths, phase shifting means coupled to said second modulation generator for shifting the phase of said second modulation signal relative to said first modulation signal, reference signal means coupled to said phase shifting means and responsive to said second modulation generator to provide a receiver reference signal modulated by said second modulation signal, multiplier means adapted to receive said carrier wave signal and coupled to said reference signal means, said multiplier means acting to multiply said reference signal and said received carrier wave signal, and integrator means coupled to said multiplier means for integrating the signal produced by said multiplier means.

4. A signal transmission system including in combination, a transmitter having a first modulation generator for providing a first quasi-random noise modulation signal having a predetermined order of pulse signals, said pulse signals having a pulse duration less than the interval between the reception of any two identical signals modulated by said first quasi-random noise signal, means coupled to said first modulation signal generator and responsive to said first modulation signal to form a carrier wave signal modulated by said first modulation signal, and a receiver having a second modulation generator for providing a second quasi-random noise modulation signal substantially the same as said first modulation signal, phase shifting means coupled to said second modulation generator for shifting the phase of said second modulation signal relative to said received first modulation signal, reference signal means coupled to said second modulation generator means and responsive to said second modulation signal to provide a receiver reference signal modulated by said second modulation signal, multiplier means adapted to receive said carrier wave signal and coupled to said reference signal means, said multiplier means acting to multiply said reference signal and said carrier wave signal, and integrator means coupled to said multiplier means for integrating the signal produced by said multiplier means.

5. A signal transmission system including in combination, a transmitter having a first modulation generator for providing a first quasi-random noise modulation signal having a predetermined order of pulse signals, said pulse signals having a pulse duration less than the interval between the reception of any two identical signals modulated by said first quasi-random noise signal, means coupled to said first modulation signal generator and responsive to said first modulation signal to form a carrier wave signal modulated by said first modulation signal, a receiver having a second modulation generator for providing a second quasi-random noise modulation signal substantially the same as said first modulation signal, phase shifting means coupled to said second modulation generator for shifting the phase of said second modulation signal relative to said received first modulation signal, reference signal means coupled to said phase shifting means and responsive to said second modulation signal to provide a receiver reference signal modulated by said second modulation signal, multiplier means adapted to receive said carrier wave signal, band pass filter means coupling said reference signal means to said multiplier means, said multiplier means acting to multiply said reference signal and said received carrier wave signal, and integrator means coupled to said multiplier means for integrating the signal produced by said multiplier means.

6. A signal transmission system including in combination, a transmitter having a first signal generator for providing a first quasi-random noise modulation signal having a predetermined order of pulse signals with a first pulse duration and a predetermined period longer than the interval between the reception of any two identical signals modulated by said first quasi-random noise signal, means coupled to said first modulation signal generator and responsive to said first modulation signal to form a carrier wave signal modulated by said first modulation signal, a receiver having a second modulation generator for providing a second quasi-random noise modulation signal having said predetermined order of pulse signals and said predetermined period, said second quasi-random noise signal having a second pulse duration less than the interval between the reception of any two identical signals modulated by said first quasi-random noise signal and transmitted to the receiver, phase shifting means coupled to said second modulation generator for shifting the phase of said second modulation signal relative to said received first modulation signal, reference signal means coupled to said phase shifting means to provide a receiver reference signal modulated by said second modulation signal, multiplier means coupled to said reference signal means and adapted to receive said carrier wave signal, said multiplier means acting to multiply said reference signal and said received carrier wave signal, and integrator means coupled to said multiplier means for integrating the signal produced by said multiplier means.

7. A signal transmission system for distinguishing between identical signals transmitted from a single transmitter to a single receiver over different paths, said system including in combination, a transmitter having a first modulation generator for providing a first quasi-random noise modulation signal having a predetermined order of pulse signals, said pulse signals having a pulse duration less than the interval between the reception of any two identical signals transmitted over different paths, means coupled to said first modulation signal generator and responsive to said first modulation signal to form a carrier wave signal modulated by said first modulation signal, and a receiver having a second modulation generator for providing a second quasi-random noise modulation signal substantially the same as said first modulation signal, a first phase shifting means coupled to said second modulation generator for shifting the phase of said second modulation signal relative to said first modulation signal, reference signal means for providing a reference signal having substantially the same frequency as said carrier wave signal, a second phase shifting means coupled to said reference signal means for shifting the phase of said reference signal relative to said carrier wave signal, modulator means coupled to said first and second phase shifting means to provide a receiver reference signal modulated by said second modulation signal, multiplier means adapted to receive said carrier wave signal, band pass filter means coupling said modulator means to said multiplier means for applying said receiver reference signal thereto, said multiplier means acting to multiply said receiver reference signal and said carrier wave signal, and integrator means coupled to said multiplier means for integrating the signal produced by said multiplier means.

8. A signal reception system for distinguishing between identical signals received at different times and modulated by a first quasi-random noise signal having a predetermined order of pulse signals with a first duration and predetermined period, including in combination, a receiver having a signal generator for providing a reference signal modulated by a second quasi-random noise signal having said predetermined order of pulse signals with said predetermined period, said second quasi-random noise signal having a second pulse duration no greater than said first pulse duration and less than the interval between the reception of any two of said identical signals modulated by said first quasi-random noise signal, said signal generator including phase shifting means for shifting the phase of said second quasi-random noise signal relative to said received first quasi-random noise signal, said receiver including multiplier means coupled to said signal generator and adapted to receive said carrier wave signal, said multiplier means acting to multiply said reference signal and said carrier wave signal, and integrator means coupled to said multiplier means for integrating the signal produced by said multiplier means.

9. A signal reception system for distinguishing between identical signals modulated by a first quasi-random noise signal having a predetermined order of pulse signals with a first pulse duration and a predetermined period and transmitted to a single receiver over different paths whereby said identical signals are received at different times, including in combination, a receiver including a signal generator for providing a reference signal modulated by a second quasi-random noise signal having said predetermined order of pulse signals with said predetermined period, said second quasi-random noise signal having a second pulse duration no greater than said first pulse duration and less than the interval between the reception of any two of the identical signals transmitted to the receiver over different paths, said signal generator including phase shifting means for shifting the phase of said second quasi-random noise signal relative to said first quasi-random noise signal, said receiver including correlation means coupled to said second signal generator and adapted to receive said carrier wave signal, said correlation means being responsive to said carrier wave signal and said reference signal to develop a correlation function to thereby distinguish between identical signals transmitted over different paths.

10. A signal reception system for distinguishing between identical carrier wave signals modulated by a first quasi-random noise modulation signal having a predetermined order of pulse signals, with a first pulse duration and a predetermined period and transmitted to a single receiver over different paths, including in combination, a receiver having a modulation generator for providing a second quasi-random noise modulation signal substantially the same as said first modulation signal, a first phase shifting means coupled to said modulation generator for shifting the phase of said second modulation signal relative to said first modulation signal, reference signal means for providing a reference signal having substantially the same frequency as said carrier wave signal, a second phase shifting means coupled to said reference signal means for shifting the phase of said reference signal relative to said carrier wave signal, modulator means coupled to said first and second phase shifting means to provide a receiver reference signal modulated by said second modulation signal, multiplier means adapted to receive said carrier wave signal, band pass filter means coupling said modulator means to said multiplier means for applying said receiver reference signal thereto, said multiplier means acting to multiply said receiver reference signal and said carrier wave signal, and integrator means coupled to said multiplier means for integrating the signal produced by said multiplier means.

References Cited
UNITED STATES PATENTS

| | | | |
|---|---|---|---|
| 2,401,618 | 6/1946 | Crosby | 325—141 |
| 2,422,664 | 6/1947 | Feldman | 325—65 |
| 2,448,055 | 8/1948 | Silver et al. | 325—33 |
| 2,982,853 | 5/1961 | Price et al. | 325—56 X |
| 3,099,795 | 7/1963 | Frank | 325—47 |
| 3,157,874 | 11/1964 | Altar et al. | 325—65 X |
| 3,168,699 | 2/1965 | Sunstein et al. | 325—42 X |

JOHN W. CALDWELL, *Primary Examiner.*